United States Patent Office 3,162,851
Patented Dec. 22, 1964

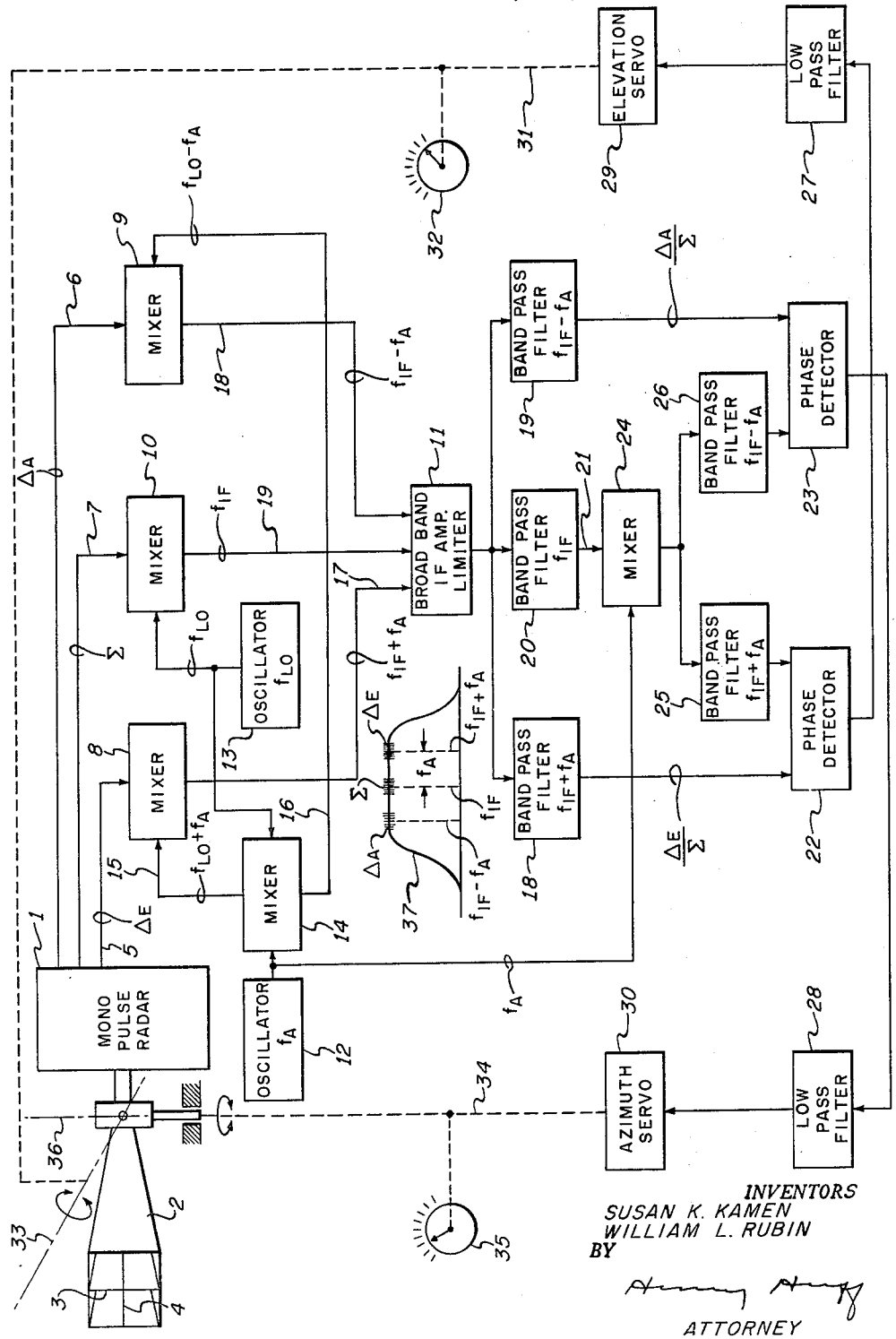

3,162,851
SINGLE CHANNEL MONOPULSE RADAR
RECEIVER
Susan K. Kamen, Jamaica Estates, and William L. Rubin, Whitestone, N.Y., assignors to Sperry Rand Corporation, Great Neck, N.Y., a corporation of Delaware
Filed Feb. 27, 1961, Ser. No. 91,930
11 Claims. (Cl. 343—16)

The present invention generally relates to monopulse radar receivers and, more particularly, to a monopulse radar receiver having a single channel for processing received target data signals.

A monopulse radar conventionally is adapted to simultaneously emit microwave energy in each of four adjacent lobe patterns. Each of the lobe patterns is arranged for the irradiation of a respective spatial quadrant located about the boresight or target tracking axis of the radar. By combining the reflected microwave energies received from within the four quadrants, three control voltages are derived for the actuation of the target elevation, azimuth and range tracking servos of the monopulse radar.

Each of the elevation and azimuth servo control voltages is produced by comparing the amplitudes of the reflected energies which are received in a respective pair of the aforementioned four quadrants. It is important that the difference between the amplitudes of said reflected energies be solely a measure of the angular deviation of the target from boresight. Any difference between the amplitudes of the reflected energies attributable to other criteria such as, for example, target range, must be eliminated in order that the respective target angular tracking means be accurately positioned.

Provision is made in prior art monopulse radar receivers for making the angle tracking servo control or error signal insensitive to fluctuations in the amplitude of target echo signals due to changes in the range of the target. Such provision includes the automatic gain control of each of a plurality of amplifiers through which the respective error signals pass. The gain of each of the error signal amplifiers must be controlled in identical fashion. This requirement present a formidable design problem.

In accordance with the present invention, a single amplifier is substituted for the plurality of separate error signal amplifiers utilized in the prior art. Each of the error signals are applied to the same amplifier. By means of a specially arranged automatic gain control system which utilizes the single amplifier as an integral element, each of the error signals is gain controlled at the same time in identical fashion. Moreover, the gain control operation is essentially instantaneous.

It is the principal object of the present invention to provide a monopulse radar receiver having a single channel for processing target data signals.

Another object is to provide a monopulse radar receiver adapted for the instantaneous automatic gain control of each of a plurality of target data signals.

A further object is to provide in a monopulse radar receiver a single means for normalizing each of a plurality of error signals representing respective angular deviations of a target from the boresight axis of the radar.

Another object is to provide a simplified monopulse radar receiver adapted for the angular tracking of target echo signals.

An additional object is to provide a simple, compact structure for the instantaneous automatic gain control of angular tracking error signals produced in a monopulse radar receiver.

A further object is to provide in a monopulse radar receiver instantaneous automatic gain control means for the processing of received signals varying over a wide dynamic range.

Another object is to provide a monopulse radar receiver adapted for the production of target angular deviation data signals in real time on a large multiplicity of individual targets.

These and other objects of the present invention, as will appear more fully from reading of the following specification, are accomplished according to the present invention by the provision of broadband amplifier-limiter means for normalizing the target angular error signals generated by a conventional monopulse radar. In a typical embodiment, the monopulse radar produces a target azimuth error signal, a target elevation error signal and a target reference or sum signal which is substantially insensitive to target angular deviations from the boresight or tracking axis of the radar.

The azimuth and elevation error signals and the sum signals are shifted in frequency by conventional heterodyning techniques to three closely spaced intermediate frequencies within the bandpass of the amplifier-limiter. The function of the amplifier-limiter, as will be more fully explained later, is to normalize each of the azimuth and elevation error signals in terms of the sum signal. The normalization of the error signals in effect eliminates fluctuations attributable to target range or target size so that the target error signal amplitudes unambiguously represent only the angular deviations of the target from the radar boresight. This is also the purpose of prior art automatic gain control systems which normalize the amplitudes of the azimuth and elevation error signals.

A plurality of bandpass filters is connected to the output of the amplifier-limiter for extracting those components of the output signal which are at the respective frequencies of the azimuth error signal, elevation error signal and sum signal inputs to the amplifier-limiter. The normalized azimuth and elevation error signals appear at the outputs of respective ones of the bandpass filters.

The signal appearing at the outputs of the bandpass filter associated with the sum signal is converted in frequency to the frequencies of the signals appearing at the outputs of the other bandpass filters. Then, a phase comparison is made between each of the normalized error signals and a respective one of the converted sum signals to develop control signals in the usual manner for representing in terms of elevation and azimuth coordinates the sense and the amount of angular departure, if any, of the target from radar boresight.

For a more complete understanding of the invention, reference should be had to the sole figure which is a simplified block diagram of a typical embodiment. In the sole figure, a conventional monopulse radar is generally represented by the numeral 1. Microwave energy generated by the transmitter included in radar 1 is radiated by four-quadrant horn 2. Radar 1 and horn 2 may be of the type disclosed in Patent 2,759,154, issued to P. G. Smith et al., on August 14, 1956, and assigned to the present assignee. Horn 2 is divided into four quadrant portions by septums 3 and 4. As described in the aforementioned patent, a microwave comparator device included wtihin radar 1 operates to compare the magnitudes of the microwave energies received above and below septum 4 and to compare the amplitudes of the microwave energies received on either side of septum 3. A difference or error signal representing the relative amplitudes of the microwave energies received above and below septum 4 is applied to the input of the elevation coordinate tracking channel by line 5. Similarly, the error signal representing the relative amplitudes of the microwave energies received on either side of septum 3 is directed by line 6 to the input of the azimuth coordinate tracking channel. Radar 1 additionally produces on line 7 a microwave signal having an amplitude which is proportional to the sum of the microwave energies received in all four quadrant portions of horn 2. The sum signal is substantially insensitive to target angular deviations from radar boresight.

The elevation and azimuth error signals are applied to first inputs of mixers 8 and 9, respectively. The sum signal is applied by line 7 to a first input of mixer 10. The purpose of mixers 8, 9 and 10 is to shift the frequency of each of the error and sum signals (which are at the same microwave frequency on lines 5, 6 and 7) to three closely spaced intermediate frequencies within the bandpass of broadband I.F. amplifier-limiter 11. The frequency conversions are coherently accomplished with the aid of oscillators 12 and 13 and mixer 14. The signal at the output of local oscillator 13 is jointly applied to the second input of mixer 10 and to a first input of mixer 14. A relatively low frequency signal generated by oscillator 12 is applied to the second input of mixer 14. Mixer 14 produces an upper side band output signal on line 15 and a lower side band output signal on line 16.

As indicated in the drawing, $f_A$ and $f_{LO}$ respectively represent the frequency of oscillator 12 and the frequency of oscillator 13. Thus, an upper side band signal of frequency $f_{LO}+f_A$ is produced on line 15 whereas a lower side band signal at frequency $f_{LO}-f_A$ is produced on line 16. The upper side band signal is applied to the second input of mixer 8 to produce on line 17 a signal at the frequency $f_{IF}+f_A$ representing the elevation error signal $\Delta E$. Similarly, the lower side band signal is applied to the second input of mixer 9 to produce on line 18 an output signal at frequency $f_{IF}-f_A$ representing the azimuth error signal $\Delta A$. A signal at the frequency $f_{IF}$ representing the sum signal $\Sigma$ is produced on line 19. The signals appearing on line 17, 18 and 19 are jointly applied to amplifier-limiter 11. The relationships between the frequencies of the signals appearing on lines 17, 18 and 19 and the band pass or transfer characteristic 37 of amplifier-limiter 11 is shown in the diagram drawn adjacent amplifier-limiter 11.

It can be shown that, when two signals at different frequencies are simultaneously applied to a hard limiter and the amplitude of one of the two signals exceeds the limit threshold, a signal component is produced at the output of the limiter having an amplitude related to the quotient of the two signals applied to the input of the limiter. In particular, the quotient represents the division of the non-limited smaller signal by the limited larger signal. The frequency of the quotient signal at the output of the limiter is identical to the frequency of the lesser amplitude input signal. As shown more fully in copending patent application Serial No. 91,973, for A System for Determining the Quotient of Two Amplitude Modulated Signals, filed February 27, 1961, in the names of the present inventors and assigned to the present assignee, the quotient signal (which may be extracted by means of a bandpass filter tuned to the frequency of the lesser amplitude input signal) may be made to approach the value of the true quotient to an arbitrary degree of exactitude by increasing the ratio of the stronger signal to the weaker signal.

In terms of the disclosed embodiment, the stronger signal applied to the limiter is the sum signal appearing on line 19. In this case, however, there are two weaker signals, one being the elevation error signal of line 17 and the other being the azimuth error signal of line 18. All three signals are amplified in the amplifier portion of amplifier-limiter 11. However, only the initially greater amplitude sum signal is amplified to a level exceeding the limiting threshold. Thus, the amplitude of each of the two error signals is suppressed in limiter 11 by an amount which substantially depends upon the amplitude of the sum signal to achieve automatic gain control of the error signals. Such gain control action is essentially instantaneous. There are no relatively large time constant circuits involved such as are associated with conventional automatic gain control circuits.

It can be seen that for a given angular deviation of the target from the radar boresight axis, the amplitudes of all three microwave signals appearing on lines 5, 6 and 7, would increase in the case of an incoming target. However, the degree to which the error signals of lines 17 and 18 are suppressed within limiter 11 also increases in proportion to the increase in the amplitude of the microwave sum signal of line 19. Thus, the amplitudes of the error signal components extracted by bandpass filters 18 and 19 tend to remain constant irrespective of changes in the radial range of the target as measured along a given angle relative to the boresight axis of horn 2. In this manner, a gain controlled or normalized elevation error signal is produced at the output of filter 18 whereas a normalized azimuth elevation signal is produced at the output of filter 19. A limited (constant amplitude) sum signal is extracted by bandpass filter 20 and appears on output line 21.

In the case of the disclosed embidment, I.F. amplifier-limiter 11 may be a conventional cascaded intermediate frequency amplifier having limiting characteristics by virtue of grid and plate limiting or by the addition of biased crystal diodes to each amplifier stage. A suitable broadband I.F. amplifier-limiter is shown in Radiotron Designer's Handbook, fourth edition, 1952, page 1150, Figure 29.3.

The gain controlled elevation and azimuth error signals are applied to first inputs of phase detectors 22 and 23, respectively. The limited sum signal appearing on line 21 is translated in frequency to the frequencies of the elevation and azimuth error signals by means of mixer 24, a second input to which is connected to the output of oscillator 12. The upper side band signal (at the frequency $f_{IF}+f_A$ of the elevation error signal) is extracted by bandpass filter 25 and applied to the second input of phase detector 22. The lower side band signal (at the frequency $f_{IF}-f_A$ of the azimuth error signal) is extracted by bandpass filter 26 and applied to the second input of phase detector 23. The purpose of phase detectors 22 and 23, as more fully described in the aforementioned Patent 2,759,154 is to generate output signals for respectively indicating the amplitude and sense of deviation both in elevation and in azimuth of the target from the boresight axis of horn 2.

The signal component of interest at the outputs of phase detectors 22 and 23 is the respective D.C. component which is extracted, respectively, in low pass filters 27 and 28. The output of filter 27 is applied as a control signal to elevation servo 29. Similarly, the D.C. signal output of filter 28 is applied as a control signal to azimuth servo 30. The mechanical shaft output 31 of servo 29 simultaneously positions elevation deviation indicator 32 and horn 2 about horizontal axis 33. The mechanical shaft output 34 of servo 30 drives azimuth deviation indicator 35 and positions horn 2 about vertical axis 36. In this manner horn 2 is positioned about respective axes 33 and 36 to bring the boresight of horn 2 to bear on the target.

It should be noted that although closed loop antenna tracking servos have been disclosed in the preferred embodiment, the present invention does not require such an antenna positioning arrangement. In fact, the invention may be employed with particular advantage for the so-called open loop data tracking of a great multiplicity of targets in which case the position of the antenna or horn 2 is not controlled in accordance with the error signal outputs of phase detectors 22 and 23. It should be observed that the output signals of phase detectors 22 and 23 are normalized monotonic functions of target angle off boresight. The angular deviation data represented by the output signals may be directly utilized for the simultaneous and essentially instantaneous computation of tracking information respecting a large multiplicity of targets. It is not necessary that the position of horn 2 be changed in order to effect such computation. So long as each of the multiplicity of target signals are non-overlapping, i.e., the separation between targets is greater than the range resolution of the radar, then a discrete pair of output signals will be produced by phase detectors 22 and 23 instantly representing the elevation and azimuth angular deviation of the respective target from the boresight axis horn 2.

It should be noted that the normalization of the elevation and azimuth error signals may be accomplished at microwave frequencies rather than at intermediate frequencies as shown in the disclosed embodiment. In such a case, the need for local oscillator 13 and mixers 10 and 14 is dispensed with. Mixers 8 and 9 and oscillator 12 are retained for the purpose of translating the microwave frequencies of the azimuth and elevation error signals of lines 6 and 5 away from the microwave frequency of the sum signal of line 7. The amount of the frequency translation would be determined by the frequency of oscillator 12 as in the case of the sole figure. Normalization at microwave frequencies is then accomplished by directly applying the signals of lines 17, 7 and 18 (now at microwave frequencies) to a high gain saturated travelling wave tube.

It can be seen from the preceding specification that the objects of the present invention have been achieved by the provision of a single amplifier-limiter for processing each of the monopulse radar target data signals. The use of the single amplifier eliminates the problems associated with the matching of the plurality of amplifiers of the prior art. Additionally, the signal limiting characteristic associated with the single amplifier provides for the esesntially intsantaneous automatic gain control of the azimuth and elevation error signals. This produces a very large signal dynamic range capability in the radar receiver. Moreover, the essentially instantaneous nature of the automatic gain control function permits the simultaneous computation of the open loop tracking coordinates of a great multiplicity of targets.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a monopulse radar receiver producing a first target signal representing the angular deviation of a target from the tracking axis of said receiver and producing a second target signal which is substantially insensitive to the angular deviation of said target from said tracking axis, said first and second signals having different frequencies within a predetermined band of frequencies, single channel means for processing said first and second signals, said means comprising a limiter for passing said predetermined band of frequencies, said first and second signals being applied to said limiter, and a plurality of bandpass filters connected to the output of said limiter, each filter passing a signal at a respective one of said different frequencies of said first and second signals.

2. In a monopulse radar receiver producing a first target signal at a first frequency representing the angular deviation of a target from the tracking axis of said receiver and producing a second target signal at said first frequency which is substantially insensitive to the angular deviation of said target from said tracking axis, frequency converting means for converting the frequency of one of said first and second signals to a second frequency within a predetermined band of frequencies including said first frequency, single channel means for processing the frequency converted one of said first and second signals and the other of said first and second signals, said means comprising a limiter for passing said predetermined band of frequencies, said converted one and said other of said first and second signals being applied to said limiter, and a plurality of bandpass filters connected to the output of said limiter, each filter passing a signal at a respective one of the frequencies of said one and said other of said first and second signals.

3. In a monopulse radar receiver producing a first target signal representing the angular deviation of a target from the tracking axis of said receiver and producing a second target signal which is substantially insensitive to the angular deviation of said target from said tracking axis, said first and second signals having the same frequency, frequency converting means for converting the frequencies of said first and second signals to different frequencies within a predetermined band of frequencies, single channel means for processing the frequency converted first and second signals, said means comprising a limiter for passing said predetermined band of frequencies, said frequency converted first and second signals being applied to said limiter, and a plurality of bandpass filters connected to the output of said limiter, each filter passing a signal at a respective one of the frequencies of said frequency converted first and second signals.

4. In a monopulse radar receiver producing an azimuth error signal, elevation error signal and sum signal at different frequencies within a predetermined band of frequencies, single channel means for processing said error signals and said sum signal, said means comprising a limiter for passing said predetermined band of frequencies, said azimuth and elevation error signals and said sum signal being applied to said limiter, and a plurality of bandpass filters connected to the output of said limiter, each filter passing a signal at a respective one of said different frequencies of said azimuth and elevation error signals and said sum signal.

5. In a monopulse radar receiver producing an azimuth error signal, elevation error signal and sum signal at a first frequency, frequency converting means for converting the frequency of said error signals to different frequencies within a predetermined band of frequencies including said first frequency, single channel means for processing the frequency converted error signals and said sum signal, said means comprising a limiter for passing said predetermined band of frequencies, said converted error signals and said sum signal being applied to said limiter, and a plurality of bandpass filters connected to the output of said limiter, each filter passing a signal at a respective one of the frequencies of said converted error signals and said sum signal.

6. In a monopulse radar receiver producing an azimuth error signal, elevation error signal and sum signal at the same frequency, frequency converting means for converting the frequency of said error signals and said sum signal to different frequencies within a predetermined band of frequencies, single channel means for processing the frequency converted error signals and the frequency converted sum signal, said means comprising a limiter for passing said predetermined band of frequencies, said converted error signals and said converted sum signal being applied to said limiter, and a plurality of bandpass filters connected to the output of said limiter, each filter passing a signal at a respective one of the frequencies of said converted error signals and said converted sum signal.

7. In a monopulse radar receiver producing an azimuth error signal, elevation error signal and sum signal at the same microwave frequency, frequency converting means for converting the frequency of said error signals and said sum signal to different intermediate frequencies within a predetermined band of intermediate frequencies, single channel means for normalizing the frequency converted error signals in terms of the frequency converted sum signal, said means comprising an amplifier-limiter for passing said predetermiend band of frequencies, said converted error signals and said converted sum signal being applied to said limiter, and a plurality of bandpass filters connected to the output of said limiter, each filter passing a signal at a respective one of the frequencies of said converted error signals and said converted sum signal.

8. In a monopulse radar receiver having a positionable antenna, said receiver producing a first target signal representing the angular deviation of target from the tracking axis of said receiver and producing a second target signal which is substantially insensitive to the angular deviation of said target from said tracking axis, said first and second signals having different frequencies within a predetermined band of frequencies, a limiter for passing said predetermined band of frequencies, said first and second signals being applied to said limiter, a plurality of bandpass filters connected to the output of said limiter, each filter passing a signal at a respective one of said different frequencies of said first and second signals, and means connected to receive the signals passed by said filters for positioning said antenna in response thereto.

9. In a monopulse radar receiver, apparatus for producing first and second output signals which are normalized monotonic functions of target angle off boresight, said receiver producing an azimuth error signal, elevation error signal and sum signal at different frequencies within a predetermined band of frequencies, said apparatus comprising an amplifier-limiter for passing said predetermined band of frequencies, said azimuth and elevation error signals and said sum signal being applied to said limiter, a plurality of bandpass filters connected to the output of said limiter, each filter passing a signal at a respective one of said different frequencies of said azimuth and elevation error signals and said sum signal, one of said filters producing a normalized azimuth error signal, a second of said filters producing a normalized elevation error signal, and a third of said filters producing an amplitude limited sum signal, frequency converting means connected to said third of said filters for converting the frequency of said amplitude limited sum signal to the frequencies of said normalized azimuth and elevation error signals, said frequency converting means producing a third output signal at the frequency of said normalized azimuth error signal and producing a fourth output signal at the frequency of said normalized elevation error signal, a pair of phase comparison means, means for applying said third output signal and said normalized azimuth error signal to one of said comparison means, and means for applying said fourth output signal and said normalized elevation error signal to the other of said comparison means, said pair of comparison means respectively producing said first and second output signals.

10. In a monopulse radar receiver having a positionable antenna, said receiver producing an azimuth error signal, elevation error signal and sum signal at different frequencies within a predetermined band of frequencies, apparatus comprising a limiter for passing said predetermined band of frequencies, said azimuth and elevation error signals and said sum signal being applied to said limiter, a plurality of bandpass filters connected to the output of said limiter, each filter passing a signal at a respective one of said different frequencies of said azimuth and elevation signals and said sum signal, and means connected to receive the signals passed by said filters for positioning said antenna in response thereto.

11. In a monopulse radar receiver having a positionable antenna, said receiver producing an azimuth error signal, elevation error signal and sum signal at different frequencies within a predetermined band of frequencies, apparatus comprising an amplifier-limiter for passing said predetermined band of frequencies, said azimuth and elevation error signals and said sum signal being applied to said limiter, a plurality of bandpass filters connected to the output of said limiter, each filter passing a signal at a respective one of said different frequencies of said azimuth and elevation error signals and said sum signal, one of said filters producing a normalized azimuth error signal, a second of said filters producing normalized elevation error signal and a third of said filters producing an amplitude limiter sum signal, frequency converting means connected to said third of said filters for converting the frequency of said amplitude limited sum signal to the frequencies of said normalized azimuth and elevation error signals, said frequency converting means producing a first output signal at the frequency of said normalized azimuth error signal and producing a second output signal at the frequency of said normalized elevation error signal, a pair of phase comparison means, means for applying said first output signal and said normalized azimuth error signal to one of said comparison means, means for applying said second output signal and said normalized elevation error signal to the other of said comparison means, and means connected to receive the output signals produced by said pair of comparison means for positioning said antenna in response thereto.

References Cited by the Examiner
UNITED STATES PATENTS

| | | | |
|---|---|---|---|
| 2,960,573 | 11/60 | Hodgson et al. | 179—15 |
| 2,995,750 | 8/61 | Holcomb et al. | 343—113 |
| 3,013,150 | 12/61 | Gutleber | 343—113 |
| 3,066,633 | 12/62 | Harry | 343—16 XR |

CHESTER L. JUSTUS, *Primary Examiner.*